(12) United States Patent
Levitan

(10) Patent No.: US 6,853,725 B2
(45) Date of Patent: Feb. 8, 2005

(54) METHOD AND APPARATUS FOR OFF-HOOK MANAGEMENT OF PLURAL SUBSCRIBER PREMISES DEVICES CONNECTED TO SAME TELEPHONE LINE

(75) Inventor: Dmitry Levitan, Fairfax, VA (US)

(73) Assignee: Hubbell Incorporated, Orange, CT (US)

( * ) Notice: Subject to any disclaimer, the term of this patent is extended or adjusted under 35 U.S.C. 154(b) by 627 days.

(21) Appl. No.: 09/814,173

(22) Filed: Mar. 22, 2001

(65) Prior Publication Data

US 2002/0176568 A1 Nov. 28, 2002

(51) Int. Cl.[7] .............................. H04M 3/42; H04M 9/00
(52) U.S. Cl. .................. 379/393; 379/207.06; 379/283; 379/286
(58) Field of Search ........................ 379/167.01, 167.08, 379/167.11, 172, 173, 207.04, 283, 286, 393, 88.07, 92.04, 93.01, 93.08

(56) References Cited

U.S. PATENT DOCUMENTS

| | | | |
|---|---|---|---|
| 4,444,999 A | | 4/1984 | Sparrevohn |
| 4,536,622 A | | 8/1985 | Rieman |
| 4,922,529 A | | 5/1990 | Kiel |
| 5,497,415 A | | 3/1996 | Kagi |
| 5,572,587 A | * | 11/1996 | Gaglani ...................... 379/393 |
| 5,592,529 A | | 1/1997 | Linsker |
| 5,612,997 A | | 3/1997 | Vallelonga, Sr. et al. |
| 5,687,176 A | | 11/1997 | Wisniewski et al. |
| 5,764,752 A | | 6/1998 | Waite et al. |
| 5,822,403 A | * | 10/1998 | Rowan ........................ 379/68 |
| 5,850,436 A | * | 12/1998 | Rosen et al. ................. 379/377 |
| 6,118,861 A | * | 9/2000 | Gutzmann et al. ...... 379/201.01 |
| 6,157,713 A | * | 12/2000 | Wu ............................. 379/393 |

* cited by examiner

*Primary Examiner*—Duc Nguyen
*Assistant Examiner*—Tuan Pham
(74) *Attorney, Agent, or Firm*—Stacey J. Longanecker; Alfred N. Goodman; Mark S. Bicks

(57) ABSTRACT

An off-hook management telecommunication system comprising a DTMF detector, an encoder and a microprocessor located within a channel unit. The system allows the user to depress a selected sequence of keys during a line connection which indicate to the microprocessor to hold the line off-hook, via signaling to a central office, despite the fact that the telephone is being returned to an on-hook position. The line is held off-hook for a predetermined amount of time to allow the user to switch telephones.

13 Claims, 4 Drawing Sheets

METHOD AND APPARATUS FOR OFF-HOOK MANAGEMENT OF PLURAL SUBSCRIBER PREMISES DEVICES CONNECTED TO SAME TELEPHONE LINE

FIELD OF THE INVENTION

The invention relates generally to a telephone off-hook management system for use with two or more telephones connected to the same telephone line at a subscriber premises. More particularly, the invention provides detection and processing of tones entered via a telephone keypad while the telephone is off-hook to allow placement of the telephone on-hook and subsequent pick up of another telephone without termination of the initial call.

BACKGROUND OF THE INVENTION

A digital loop carrier (DLC) carries plural voice and/or data channels over a number of lines. A DLC comprises a Central Office Terminal (COT), a remote terminal (RT), and multiple subscriber lines. The RT contains channel units with line cards and serves to connect individual subscriber lines to the COT. The transmit direction of a DLC comprises voice frequency signals entering the channel units from the subscriber premises. These voice frequency signals produce pulse amplitude modulation (PAM) samples at an 8 kHz rate. This sampling of channels is performed in a fixed sequence, producing a stream of pulses. Each PAM pulse is encoded into a pulse code modulation (PCM) word by the channel unit coder/decoder (CODEC) therein.

A transmit/receive unit (TRU) at an RT, for example, polls the plurality of channel units therein for PCM words using sequential polling. The TRU time division multiplexes the PCM words into a bitstream and transmits the bitstream to a line interface unit (LIU). The LIU converts the bitstream from the TRU into a T1 signal. This T1 signal is then transmitted to the COT.

Regarding the reception of the signals from an RT by the subscriber premises, the LIU performs framing on the T1 input from a line and sends it to the TRU. The TRU then distributes the PCM to the channel units which decode the PCM into corresponding PAM pulses. The voice frequency signals are then reconstructed, and sent over a twisted pair line to the subscriber.

In a T1 digital carrier system, for example, a voice signal is sampled, resulting in a PAM signal that is converted to an 8-bit PCM digital signal, and then interleaved with 23 other channels for transmission over a T1 line at a bit stream rate of 1.544 megabits per second (Mbps). T1 signals are processed in a channel bank such as the channel bank 50 depicted in FIG. 1. In a conventional digital channel bank 50, twenty-four channels are collectively referred to as a digroup. Channel banks typically comprise two digroups A and B to create a 48-channel framework for transmitting and receiving on two duplex T1 carriers. As shown in FIG. 1, the channel bank 50 comprises a chassis 90 having physical card slots 60 into which at least forty-eight channel unit (CU) cards 80 can be inserted, as well as a number of common equipment cards 70.

A disadvantage of current telephone systems is evident when a subscriber receives an incoming call and wishes to switch telephones. The subscriber places the first telephone off-hook and switches to a second telephone connected to the same line, thus taking a second telephone off-hook. In such a situation, if the subscriber does not place the first telephone on-hook after terminating the call, the line will be considered in use and unavailable for subsequent incoming or outgoing calls. Therefore, a need exists to allow for switching telephones, during an incoming or outgoing call, by placing a first telephone on-hook and subsequently taking a second telephone off-hook, yet not losing the initial incoming or outgoing call.

Some telephones have the ability to allow a subscriber to enable/disable an on-hold function while the subscriber answers another telephone line or switches to another telephone that is also provided with an on-hold enable/disable function. This on-hold feature is accomplished via components located within the telephone, and is not available to other telephones at the subscriber premises if they lack the internal components to support this function. Therefore, a need exists to allow remote processing (e.g., at a remote terminal or a central office) of a series of dual-tone multi-frequency (DTMF) codes to prevent termination of a call while a first telephone is placed on-hook and, subsequently, a second telephone is placed off-hook. Thus, existing special internal components for the on-hold function, which are not typically available in a telephone, are not needed to take advantage of this feature.

Since one RT serves a plurality of subscriber premises, it would be convenient for telephone companies to offer the above mentioned off-hook management to its customers by means of the channel unit. This would require no additional special equipment in subscribers' telephones or homes.

SUMMARY OF THE INVENTION

The above described disadvantages are overcome and advantages realized by the off-hook management system of the present invention which, in a preferred embodiment, uses a channel unit that is coupled to at least one telephone via its corresponding subscriber line. Located in the channel unit is a DTMF detector, a microprocessor and a decoder which allow a subscriber to place an incoming call on-hold by dialing a sequence of DTMF tones on the telephone. The channel unit is provided with intelligence, by means of a microprocessor, to detect the DTMF tones and maintain the subscriber line in an off-hook status for a selected period of time. Thus, the subscriber is permitted to place the receiver on the cradle and thereafter continue the call using another telephone or facsimile machine.

Another aspect of the present invention provides the subscriber the ability to switch from a first telephone to a second telephone, connected to the same line, during an incoming or outgoing call. The subscriber dials a series of DTMF tones for processing by the channel unit or other device to allow placement of the first telephone on-hook, and continuation of the call on the second telephone. The channel unit or other device manages the processing function, thus eliminating the need for special components in either of the two telephones.

The foregoing aspects are substantially achieved by a channel unit in a DLC. The channel unit is coupled to at least one telephone via a subscriber line, wherein the telephone is used to generate DTMF tones comprising off-hook control signals. The channel unit comprises a DTMF detector coupled to the subscriber line. The DTMF detector detects the DTMF tones. Additionally, a microprocessor is coupled to the DTMF detector and programmable to receive an input comprising the output of the DTMF detector. Subsequently, the processor evaluates the DTMF tones to determine if it is the off-hook control signal. If the DTMF tones are the off-hook control signal, the microprocessor maintains the subscriber line in an off-hook mode for a selected period of time. Finally, the microprocessor continues to process received DTMF tone sequences. If the microprocessor determines that the DTMF tone sequences do not comprise the off-hook control signal, it continues to process the telephone call in a conventional manner, that is, based on the state of the telephone.

In addition, the present invention provides a method for achieving off-hook management by sending an off-hook control signal from a subscriber premises that is processed at a remote location such as a channel unit. The channel unit receives the off-hook control signal, preferably in the form of a selected sequence of DTMF tones, from a telephone via a subscriber line. Subsequently, the method provides the steps of detecting the off-hook control signal on the subscriber line. Initially, if the microprocessor determines that the DTMF tones on the subscriber line are off-hook control signals, then the microprocessor maintains the subscriber line in an off-hook position, for a selected period of time, despite the telephone handset being on-hook. Alternatively, if the microprocessor determines that the DTMF tones generated by the telephone keypad is not the off-hook control signals, then the microprocessor returns the subscriber line to a state dependent upon the status of the telephone and any other telephone or signal receiving device coupled to the subscriber line.

BRIEF DESCRIPTION OF THE DRAWINGS

The various aspects, advantages and novel features of the present invention will be more readily comprehended from the following detailed description when read in conjunction with the appended drawings, in which.

DETAILED DESCRIPTION OF THE PREFERRED EMBODIMENTS

Figure 1:
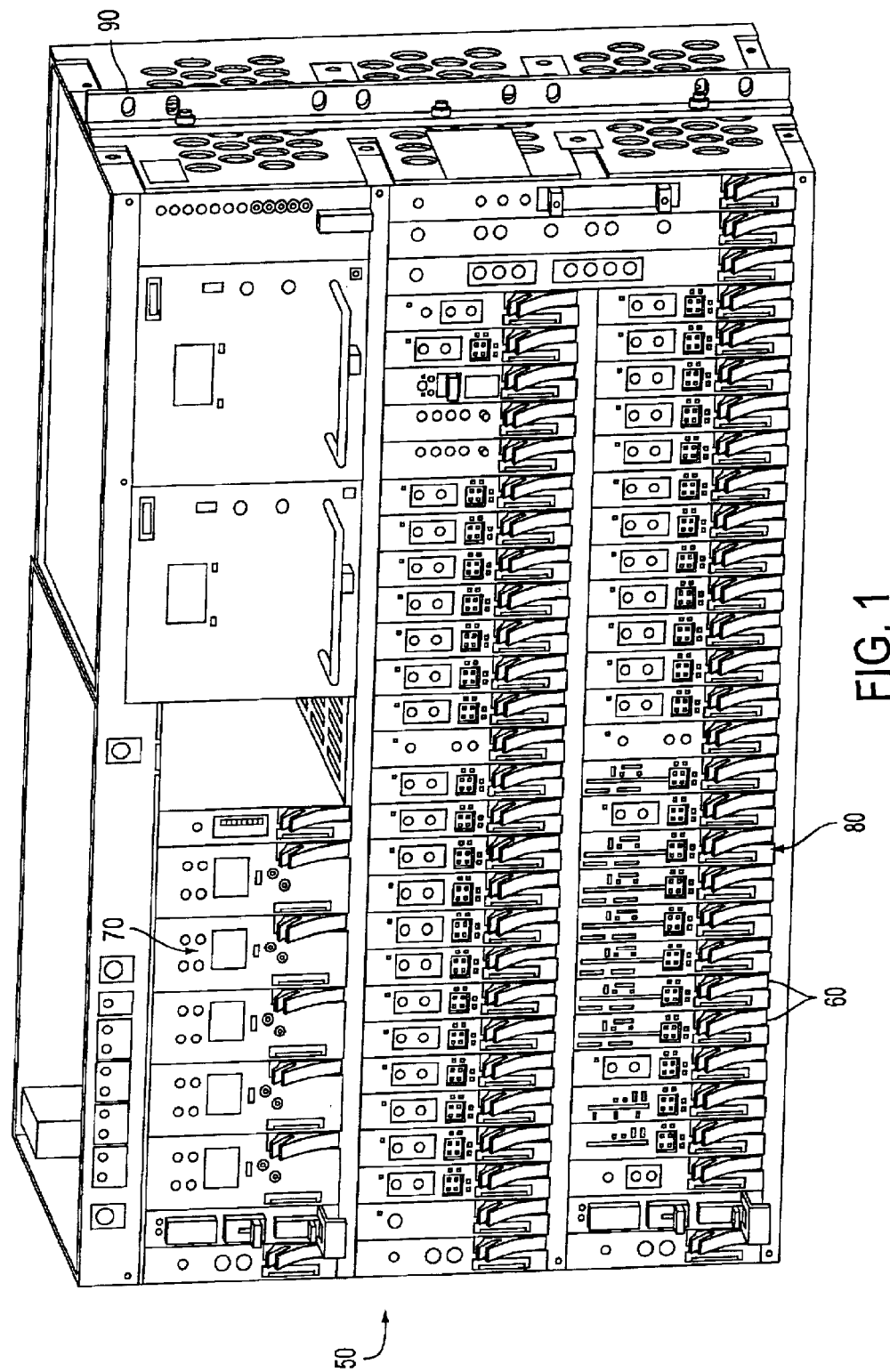
FIG. 1 is a front view of an exemplary and conventional channel bank.
Figure 2:
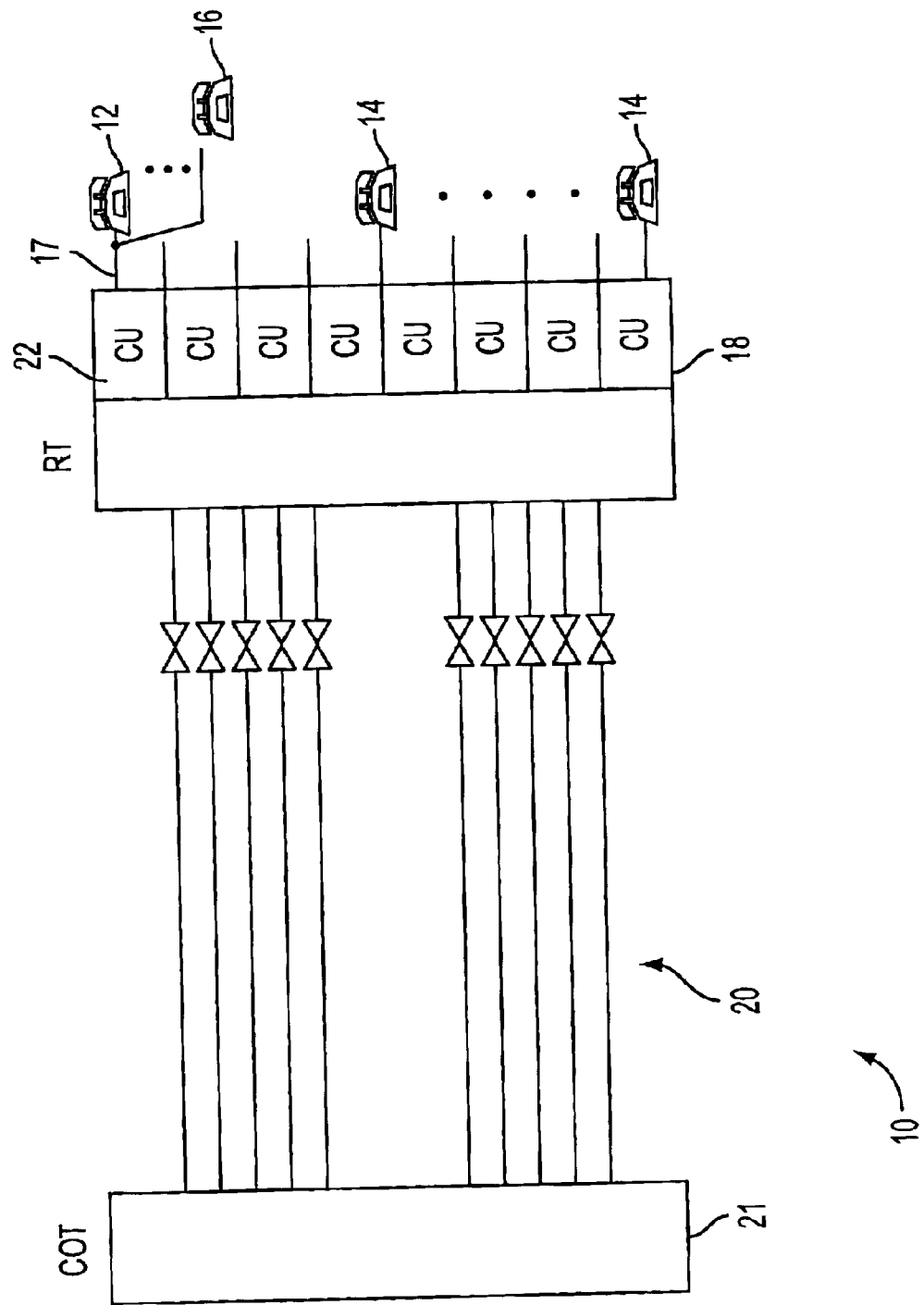
FIG. 2 is a block diagram of a conventional DLC.

FIG. 2 depicts an overview of a DLC 10. Subscriber lines 17 couple telephones 12, 14 and 16, at the subscriber premises, to channel units 22. The channel units 22 are housed in a remote terminal 18, which can be located in a residential neighborhood, for example. The channel units 22 convert the analog signal from the subscriber lines 17 to digital signals. The digital signals are pulse code modulated and carried over T1 lines 20 to a central office terminal (COT) 21.

Components located on the channel unit 22 allow the subscriber to place an incoming call on-hold, as described below. Accordingly, the telephones 12, 14, and 16 at the subscriber premises, are typical residential telephones not requiring any special internal components for implementing an on-hold function. This is a significant advantage for service providers, as they are able to offer a residential off-hook management system as an additional feature to subscribers. Such a system can be marketed similar to call waiting or call forwarding, thus generating additional revenue. Furthermore, existing channel units 22 can be retrofitted with the critical circuitry and software used to implement an embodiment of the present invention and future channel units can be manufactured in accordance with the present invention, as is described below.

If a subscriber receives a call on one telephone 12 and wishes to take the call from a second telephone 16 connected to the same subscriber line 17, an embodiment of the present invention allows the subscriber to enter a sequence of DTMF tones via the telephone 12 (e.g., via the telephone keypad) such as three star (*) keys. The subscriber places the first telephone 12 receiver on the cradle, and subsequently continues the call on a second telephone 16 without losing the off-hook status of the subscriber line 17 and, therefore the initial connection.

Figure 3:
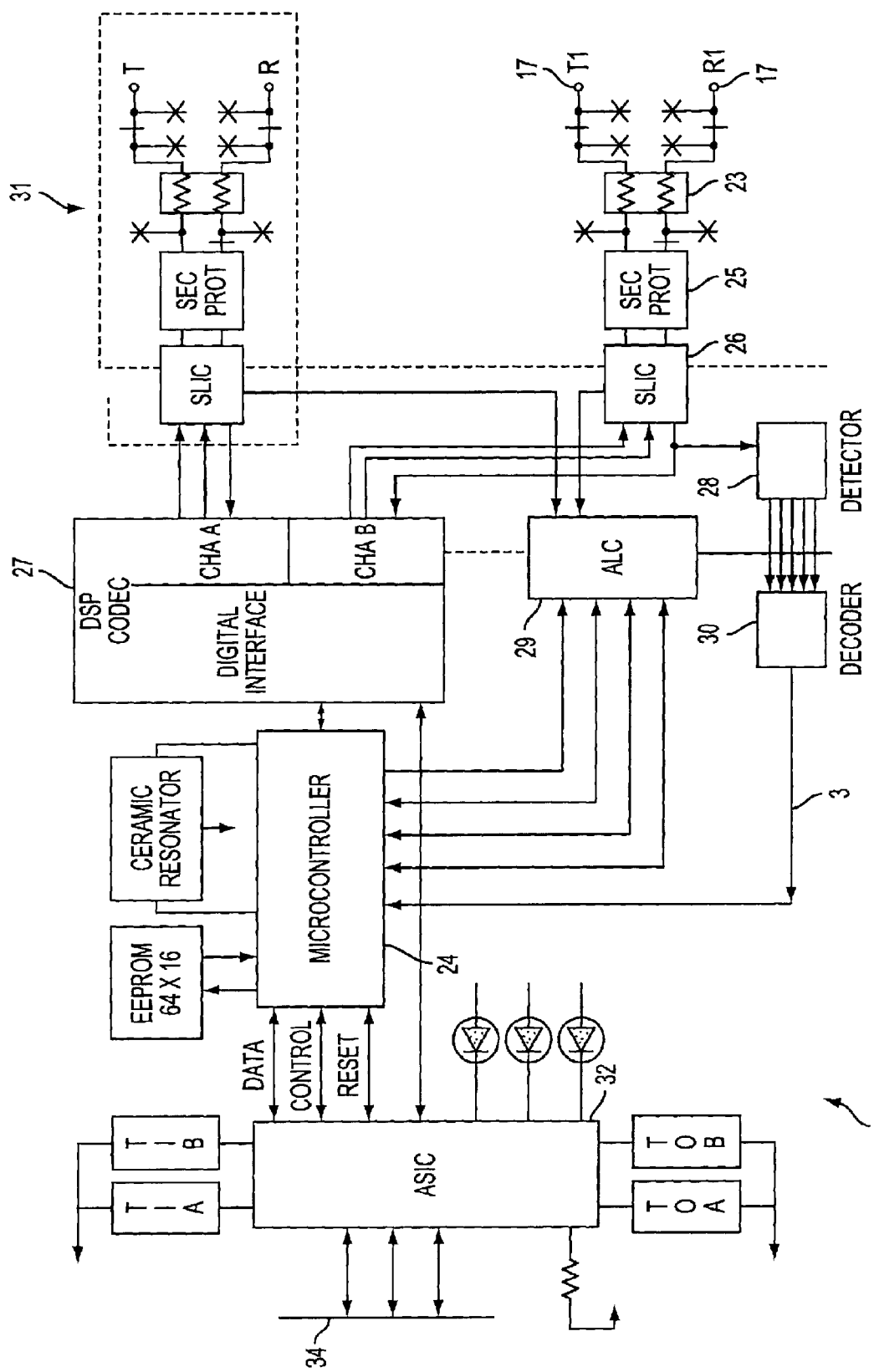
FIG. 3 is a block diagram of a channel unit constructed in accordance with an embodiment of the present invention.

Referring now to FIG. 3, an overview of an embodiment of the present invention comprises the subscriber entering the required DTMF tones, as described above. The DTMF detector 28 implemented at an RT or other remote device (e.g., a channel unit 22) detects the sequence of tones from a telephone 12 at the subscriber premises. The decoder 30 decodes a digital input signal from the output of the DTMF detector 28. The DTMF detector 28 converts the signal from analog to digital format, as described below. The decoder 30 transmits a digital signal to a microcontroller 24 of the channel unit 22 causing the microcontroller to wait for a predetermined period of time (e.g., thirty seconds) for the subscriber to switch telephones. In accordance with an embodiment of the present invention, the microcontroller 24 maintains the line in an electrically off-hook condition by transmitting appropriate signaling to the COT 21, despite the telephones 12 and 16 being physically in an on-hook condition.

The channel unit 22 of FIG. 3 receives an incoming signal on a twisted pair line 17 through a line resistor network 23, and a secondary protection circuit 25 which preferably provides protection against lightning strikes. The signals are then sent to a subscriber line interface chip (SLIC) 26. The SLIC 26 provides a current feed to power the telephone, voice interface, and ringing control. Typically, two subscribers are serviced via the same channel unit 22. Thus, the shadowed box 31 represents a second set of twisted pair lines, security protection, and additional SLIC. The signals are then sent to a DTMF detector 28 which is preferably a MITEL MT8870C/MT8870C-1 component. Table 1 illustrates the pushbutton layout on a DTMF station equipment pad and the corresponding frequencies. The operation of any pushbutton on a telephone typically generates two frequencies, depending upon the button the subscriber depresses.

|  | 1209 Hz | 1336 Hz | 1477 Hz | 1633 Hz (spare) |
|---|---|---|---|---|
| 697 Hz | 1 | ABC 2 | DEF 3 | A |
| 770 Hz | GHI 4 | JKL 5 | MNO 6 | B |
| 852 Hz | PRS 7 | TUV 8 | WXY 9 | C |
| 941 Hz | * | OPER 0 | # | D |

These DTMF tones are capable of transmitting not only address information, but also control signals, and therefore can be used as a method for data communications. The DTMF detector 28 converts these frequencies to four parallel digital bits Q1–Q4 and applies this digital output to a decoder 30, which then transmits preferably one digital bit to the microcontroller 24. For example, the decoder 30 uses digital bits Q1–Q4 from the DTNF detector 28 such that, when it receives the bits 1101 corresponding to Q1=1, Q2=1, Q3=0, and Q4=1, the decoder 30 generates a single bit "1"

indicating an on state for transmission to the microcontroller 24. However, when any other bit sequence is generated (i.e. not 1101), the decoder 30 outputs a "0" bit indicating an off state for transmission to the microcontroller 24. The input 3, of the microcontroller 24, is preferably an interrupt signal from the decoder 30. Thus, if the decoder 30 sends a "1" bit, then the software provided to the microcontroller 24 in accordance with the present invention causes the microcontroller to send an off-hook sequence to the COT 21 despite the phone being on-hook. If the input 3 of microcontroller 24 receives a "0" bit from the decoder 30, then the microcontroller 24 is programmed to process signaling on the subscriber line 24 in a conventional manner.

The DTMF detector 28 generates digital bits representative of the star key (*), including 1101. Accordingly, if the star (*) key is depressed three times, the bits sent by the DTMF detector 28 are 1101 1101 1101, in groups of four bits each. The signal is then decoded by the decoder 30 and interpreted by the microcontroller 24. If the DTMF detector 28 detects the three star sequence (***), the microcontroller 24 maintains the line off-hook for thirty seconds or a preselected period of time. The microcontroller 24 maintains the line off-hook by sending a signal to the COT 21 via an application-specific integrated circuit (ASIC) 32. The signal is transmitted from the backplane 34 of the remote terminal 18 to the T1 lines 20 that extend to the COT 21.

With continuing reference to FIG. 3, in conjunction with the operation of the DTMF detector 28, the processing of the voice signal continues. As mentioned above, the voice signal on the twisted pair lines 17 is processed by the secondary protection circuit 25, and then provided to the SLIC 26. The voice signals are processed by the coder/decoder (CODEC) 27 which interacts with the SLIC 26 to set return loss and transhybrid loss. The CODEC 27 also determines transmit and receive levels. In addition, the CODEC 27 converts the voice-frequency signals from the SLIC 26 into pulse code modulation (PCM) signals, which are sent to the ASIC 32. The ASIC 32 combines the voice data with the signaling bits from the microcontroller 24, and sends that information to the backplane 34 of the channel bank and then to the COT 21.

The above discussion is concerned with the transmit portion of the signal path from the subscriber premises. With respect to the receive portion of the signal path from the COT 21, it sends the PCM signal to the backplane 34. The signal is processed by the ASIC 32 and sent to the CODEC 27. The microprocessor 24 processes signaling information from the backplane 34. Therefore, once the COT signal enters the backplane 34, the microcontroller 24 controls the received signal, as opposed to the COT 21. The CODEC 27 provides the proper amount of gain, converts the digital PCM signal to analog format and conveys the resulting signal to the SLIC 26. Accordingly, the SLIC 26 transmits the analog signal to the subscriber via the twisted pair lines 17. As mentioned previously, an additional subscriber is serviced via the components of box 31.

The automatic loss compensation circuit (ALC) 29 determines the DC resistance of the customer drop and equipment. Once the microcontroller 24 has determined the line resistance, it calculates an appropriate gain factor for both the transmit and receive directions. The gain information is then sent to the CODEC 27.

It is to be understood that the present invention can be implemented as a channel unit 22, as described above in connection with FIG. 3. In addition, existing channel units can be retrofitted to operate as the channel unit 22 by providing existing channel units with the DTME detector 28 and decoder 30, as well as program code for operating the microcontroller therein, as described above in connection with microcontroller 24. In addition to remote terminals, the present invention can be provided to or retrofit into corresponding equipment at the central office.

Figure 4:
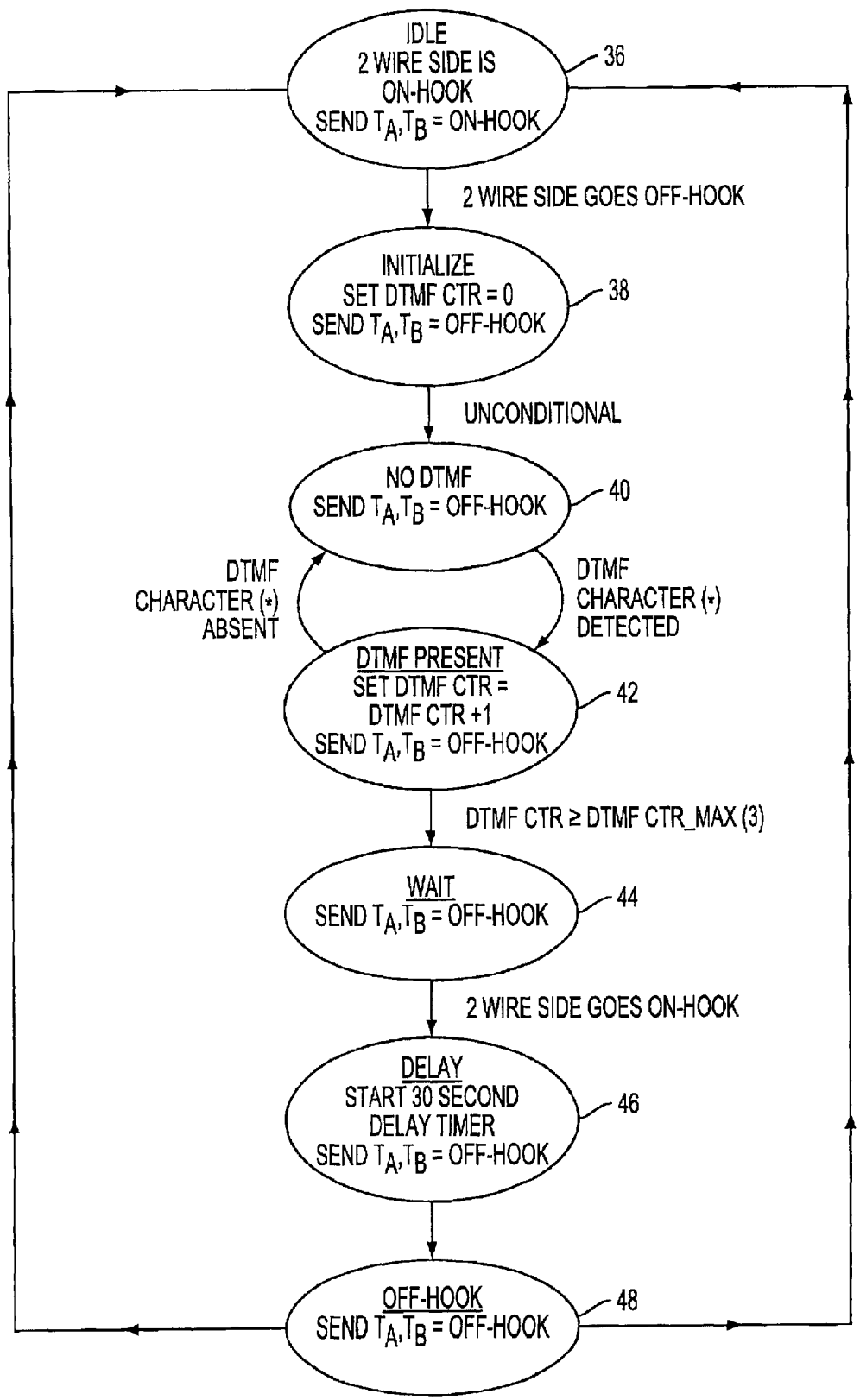
FIG. 4 is a state diagram illustrating the operational states of the channel unit of FIG. 3 in accordance with an embodiment of the present invention.

FIG. 4 is a state diagram illustrating the logical functioning of the channel unit 22, in accordance with an embodiment of the present invention. Initially, the DTMF detector 28 and decoder 30 are in an idle state 36. While the telephone 12 is on-hook, the microcontroller 24 transmits bits A and B to the COT 21, thus indicating that the telephone 12 is on-hook. Transmit bits A and B are referred to in FIG. 4 as $T_a$ and $T_b$, respectively. When a subscriber picks up a telephone receiver, the microcontroller 24 receives information indicating the telephone 12 is off-hook (state 38). As is known to those skilled in the art, supervisory signals are used to convey information to the COT 21 as to the status of the DLC. For example, transmit bits A and B are sent by the microcontroller 24 to indicate that telephone 12 is off-hook. In addition, state 38 indicates that the microcontroller 24 initializes the DTMF Counter to 0.

State 40 indicates that no DTMF signal has been sent and, further the microcontroller 24 is sending transmit bits A and B to the COT, indicating an off-hook condition. As shown in state 42, if a DTMF tone comprising the (*) character is detected as a portion of an off-hook control signal, then the DTMF CTR is increased by 1, for example, DTF CTR= DTMF CTR+1, and the microcontroller 24 continues to transmit bits A and B to the COT 21, indicating an off-hook position of the telephone 12. The microcontroller software preferably toggles between states 40 and 42, depending upon whether another DTMF tone is detected. For example, if an additional DTMF character is not sent, as in state 40, transmit bits A and B continue to be sent which indicate an off-hook position of the telephone 12. As is mentioned above, if the DTMF detector 28 receives an additional DTMF tone comprising the (*) character, as in state 42, the DTMF CIR increases by one. State 44 indicates a wait state, whereby the software is monitoring whether the DTMF CTR has reached the maximum of three (*) tones comprising the off-hook control signal, or other preselected number. If the counter is not equal to DTMF CTR=3, the toggling between state 40 and 42 continues. If the counter is equal to DTMF CTR=3, then the delay timer initiates, as indicated by state 46. Accordingly, if the DTMF CTR=3 then the subscriber is generating the off-hook control signal, via the telephone keypad. State 46 shows the microcontroller 24 continuing to transmit bits A and B to indicate an off-hook state. State 46 preferably starts a 30-second timer, or other preselected time, to allow the subscriber to switch from telephone 12 to telephone 16, for example. Although the subscriber has replaced the receiver of telephone 12 on the cradle, the microcontroller 24 ignores this on-hook condition and continues to transmit bits A and B to the COT 21 to maintain the line off-hook. State 48 shows the microcontroller 24 continuing to send transmit bits A and B in an off-hook position for the prescribed period of time. After the 30 seconds has elapsed, or other prescribed period of time, the DTMF detector 28 and decoder 30 return to the idle state as depicted in state 36.

Although only several exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A channel unit in a digital loop carrier, the channel unit being coupled to at least one telephone via a subscriber line, the at least one telephony device being operable to generate tones, the channel unit comprising:

a tone detector coupled to said subscriber line, said tone detector being operable to detect tones transmitted via said subscriber line to produce an output corresponding to an off-hook control signal;

a processing device coupled to said tone detector and programmable to receive said output of said tone detector, to evaluate said output to determine if said tones corresponding thereto represent said off-hook control signal, said off-hook control signal using at least one of a preselected order, a preselected number and preselected ones of said tones, said processing device being operable to maintain said subscriber line off-hook for a selected period of time if said output indicates said off-hook control signal, and maintain said telephony device off-hook and on-hook in accordance with when a subscriber line requests and terminates, respectively, a connection via said subscriber line using said telephony device, if said programmable device determines that said tone is not said off-hook sequence tone.

2. A channel unit as claimed in claim 1, wherein said processing device is programmable to maintain said subscriber line a user returns off-hook when said output indicates said off-hook control signal regardless of whether a user returns said telephony device to an on-hook position.

3. A channel unit as claimed in claim 1, wherein said tone detector includes a dual-tone multi-frequency tone detector.

4. A channel unit as claimed in claim 1, wherein said tone detector detects frequencies from approximately 650 Hz to approximately 1650 Hz.

5. A channel unit as claimed in claim 1, wherein said processing device includes a microcontroller programmable to process said output and transmit signals to a central office indicating on-hook and off-hook states in accordance with said output.

6. A channel unit as claimed in claim 1, wherein said subscriber line is held in an off-hook position for approximately 30 seconds when said output is determined to comprise said off-hook control signal.

7. A channel unit as claimed in claim 1, wherein said off hook sequence tone is generated by depressing the star (*) key on the keypad of said telephone a selected number of times.

8. A channel unit as claimed in claim 7, wherein said selected number of times for depressing the star key includes three.

9. A method for off-hook management on a subscriber line in a digital loop carrier, comprising the steps of:

detecting tones transmitted from a telephony device via said subscriber line;

maintaining said subscriber line off-hook for a selected period of time despite a user returning said telephony device to an on-hook position if said tones comprise an off-hook control signal; and operating said subscriber line in one of an off-hook state and an on-hook state in response to said user operation of said telephony device if said programmable device determines said tones do not comprise said off-hook control signal.

10. A method as claimed in claim 9, wherein said maintaining step comprises the step of holding said subscriber line in an off-hook position for approximately 30 seconds.

11. A method as claimed in claim 9, wherein said off-hook control signal is generated by depressing the star (*) key on a keypad of said telephony device a selected number of times.

12. A method as claimed in claim 9, wherein said detecting step is implemented via a tone detector that detects frequencies from approximately 650 Hz to approximately 1650 Hz.

13. A method as claimed in claim 9, wherein said off-hook control signal is generated by transmitting a plurality of dual-tone multi-frequency tones using at least one of a selected number and a selected order of said tones.

* * * * *